United States Patent
Xu et al.

(10) Patent No.: US 9,097,318 B2
(45) Date of Patent: Aug. 4, 2015

(54) CYCLOID PINWHEEL REDUCER

(71) Applicants: HONG FU JIN PRECISION INDUSTRY (ShenZhen) CO., LTD., Shenzhen (CN); HON HAI PRECISION INDUSTRY CO., LTD., New Taipei (TW)

(72) Inventors: Xiao-Ming Xu, Shenzhen (CN); Cheng Zhang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/161,683

(22) Filed: Jan. 22, 2014

(65) Prior Publication Data
US 2014/0309068 A1 Oct. 16, 2014

(30) Foreign Application Priority Data
Apr. 12, 2013 (CN) .......................... 2013 1 0126772

(51) Int. Cl.
*F16H 23/00* (2006.01)
*F16H 1/32* (2006.01)

(52) U.S. Cl.
CPC ............ *F16H 1/32* (2013.01); *F16H 2001/323* (2013.01)

(58) Field of Classification Search
CPC ...... F16H 1/32; F16H 1/321; F16H 2001/324
USPC ................................... 475/163, 168, 178–179
See application file for complete search history.

(56) References Cited

U.S. PATENT DOCUMENTS

| 4,338,830 | A  | * | 7/1982  | Rodaway ....................... 475/169 |
| 8,663,049 | B1 | * | 3/2014  | Yao ............................... 475/178 |
| 2002/0052262 | A1 | * | 5/2002  | Lim .............................. 475/179 |
| 2004/0220008 | A1 | * | 11/2004 | Mingishi et al. .............. 475/163 |
| 2009/0270215 | A1 | * | 10/2009 | Janek ............................ 475/168 |
| 2011/0319218 | A1 | * | 12/2011 | Imase et al. .................. 475/168 |

FOREIGN PATENT DOCUMENTS

TW M453756 U1 5/2013

* cited by examiner

*Primary Examiner* — Roger Pang
*Assistant Examiner* — Tinh Dang
(74) *Attorney, Agent, or Firm* — Novak Druce Connolly Bove + Quigg LLP

(57) ABSTRACT

A cycloid pinwheel reducer includes a housing, two cycloid pinwheels, a plurality of rollers, an output flange, and a first transmission assembly. The housing forms an inner teeth ring in an inner wall of the housing. The two cycloid pinwheels are received in the housing. Each cycloid pinwheel forms a meshing portion. The rollers roll in position between the housing and the meshing portions. The output flange is non-rotatably connected with the cycloid pinwheels. The first transmission assembly includes a first transmission gear, a second transmission gear meshed with the first transmission gear. The second transmission gear includes a base body, a second teeth portion positioned on the base body, a first eccentric portion, and a second eccentric portion. The second teeth portion is meshed with the first transmission gear. The two cycloid pinwheels is sleeved on the first and second eccentric portions respectively.

7 Claims, 4 Drawing Sheets

CYCLOID PINWHEEL REDUCER

FIELD

The present disclosure generally relates to reducers, and particularly to a cycloid pinwheel reducer.

BACKGROUND

In a common cycloid pinwheel reducer, an input shaft is mounted in a support with bearings, an eccentric shaft is positioned on the input shaft and assembled with two cycloid pinwheels, and the two cycloid pinwheels are connected to an output shaft. In use, the input shaft rotates the cycloid pinwheels via the eccentric shaft, and the output shaft rotates together with the eccentric shaft. However, the cycloid pinwheel reducer is difficult to engage with other transmission structures to reduce speed in a multiple speed reducing process. In addition, a structure engagement of the transmission structures and the input shaft is not compact enough, thus causing the cycloid pinwheel reducer to require to occupy larger amount of space.

Therefore, there is room for improvement within the art.

BRIEF DESCRIPTION OF THE DRAWINGS

The components in the drawings are not necessarily drawn to scale, the emphasis instead being placed upon clearly illustrating the principles of the present disclosure. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
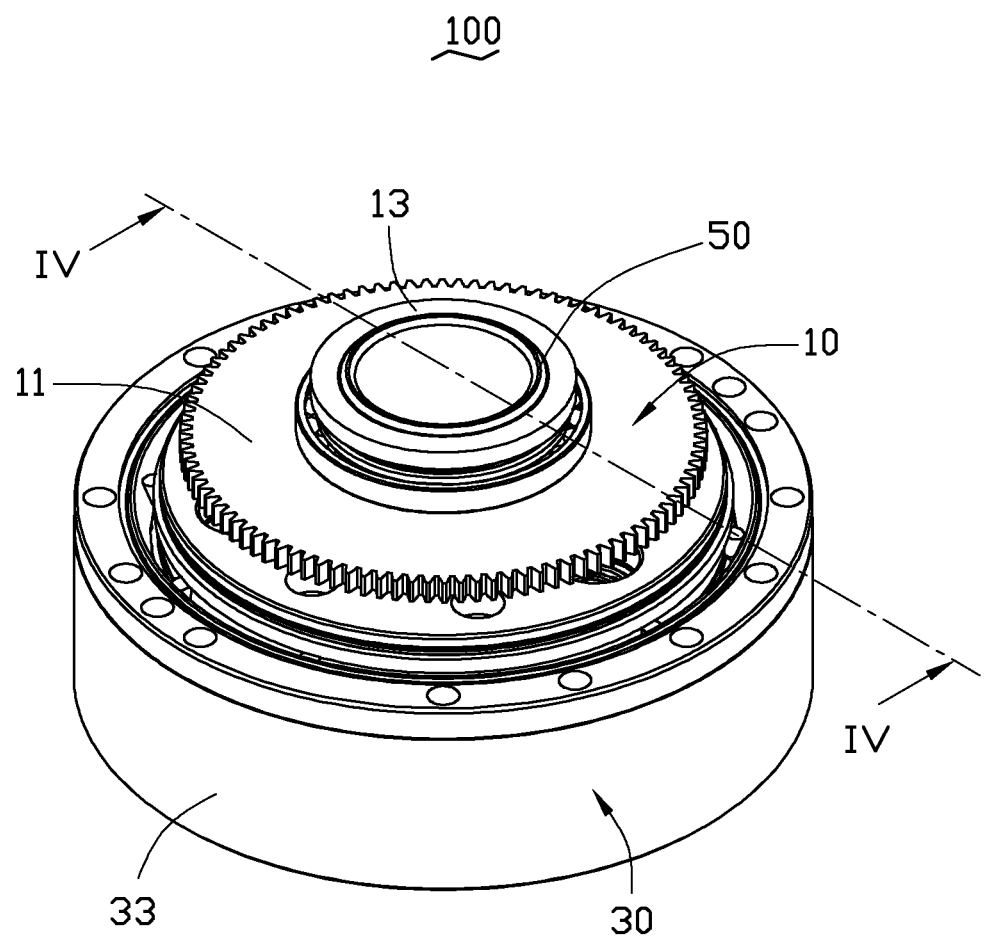
FIG. 1 shows an assembled, isometric view of an embodiment of a cycloid pinwheel reducer.

FIG. 1 shows a cycloid pinwheel reducer 100 including a first transmission assembly 10, a second transmission assembly 30, and a cable tube 50. The first transmission assembly 10 and the second transmission assembly 30 are movably assembled together. The first transmission assembly 10 is connected to an outer driving device (not shown). The cable tube 50 passes through the first transmission assembly 10 and the second transmission assembly 30 for receiving cables (not shown).

Figure 2:
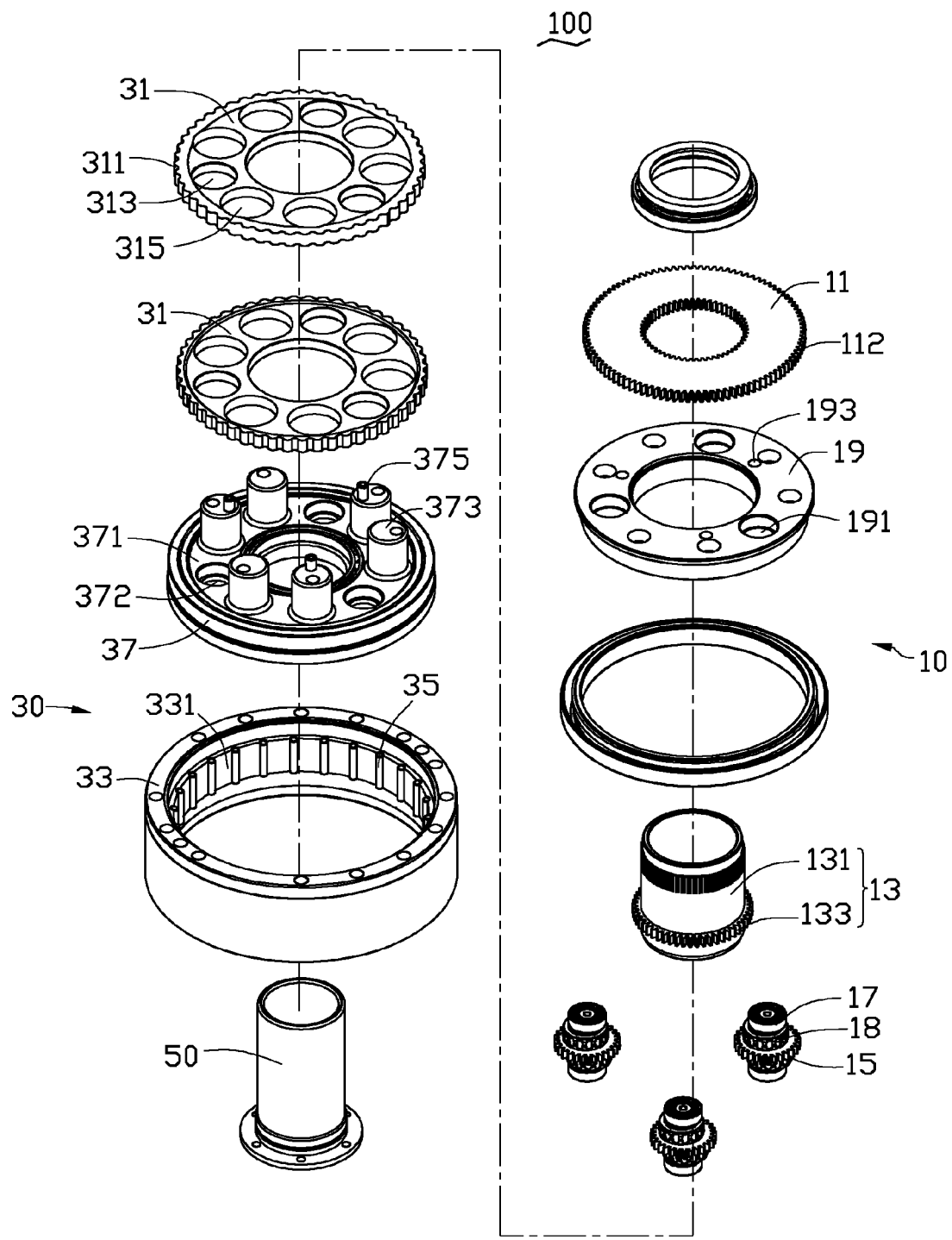
FIG. 2 shows an exploded view of the cycloid pinwheel reducer of FIG. 1.
Figure 3:
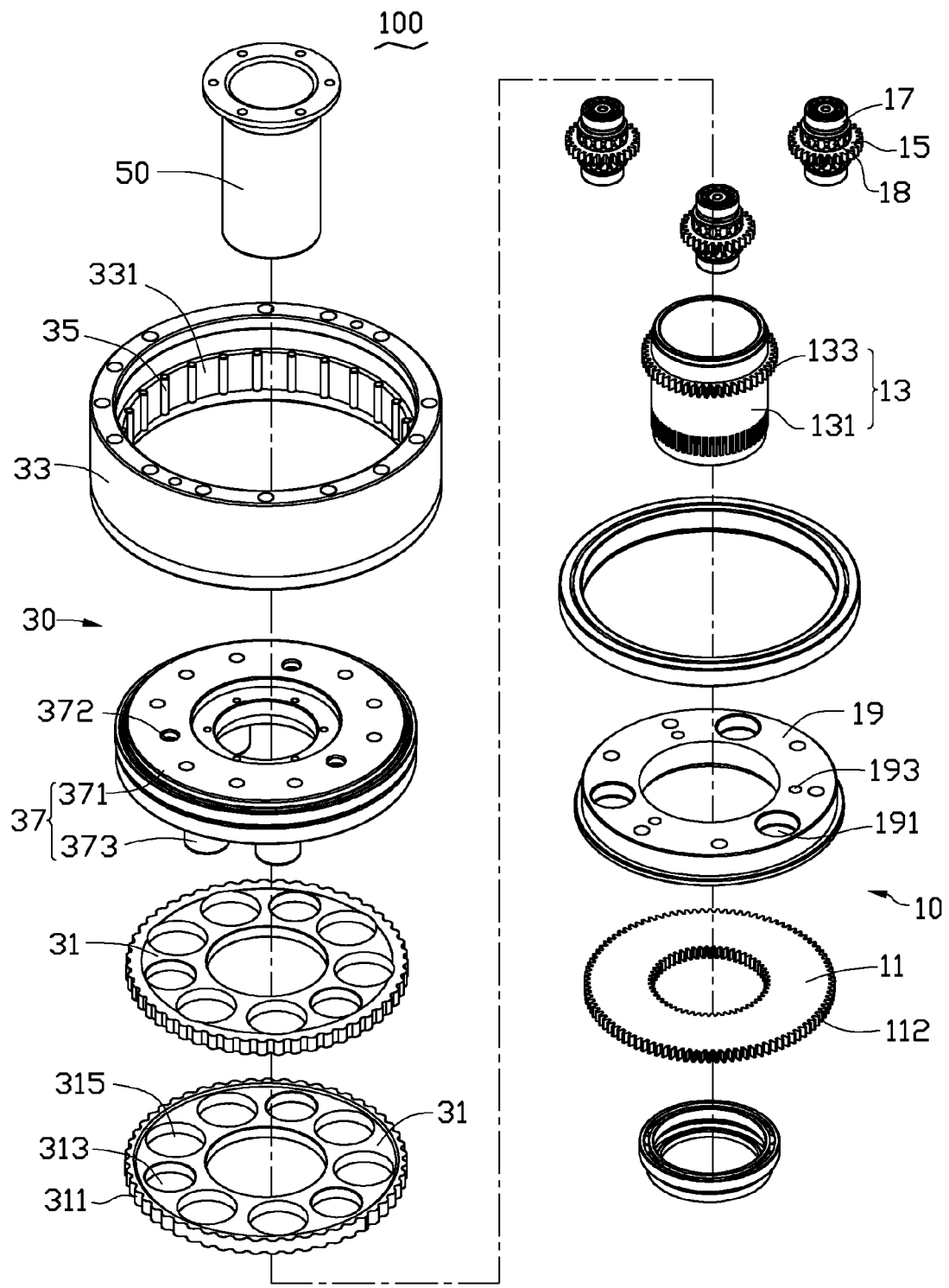
FIG. 3 is similar to FIG. 2, but from another aspect.
Figure 4:
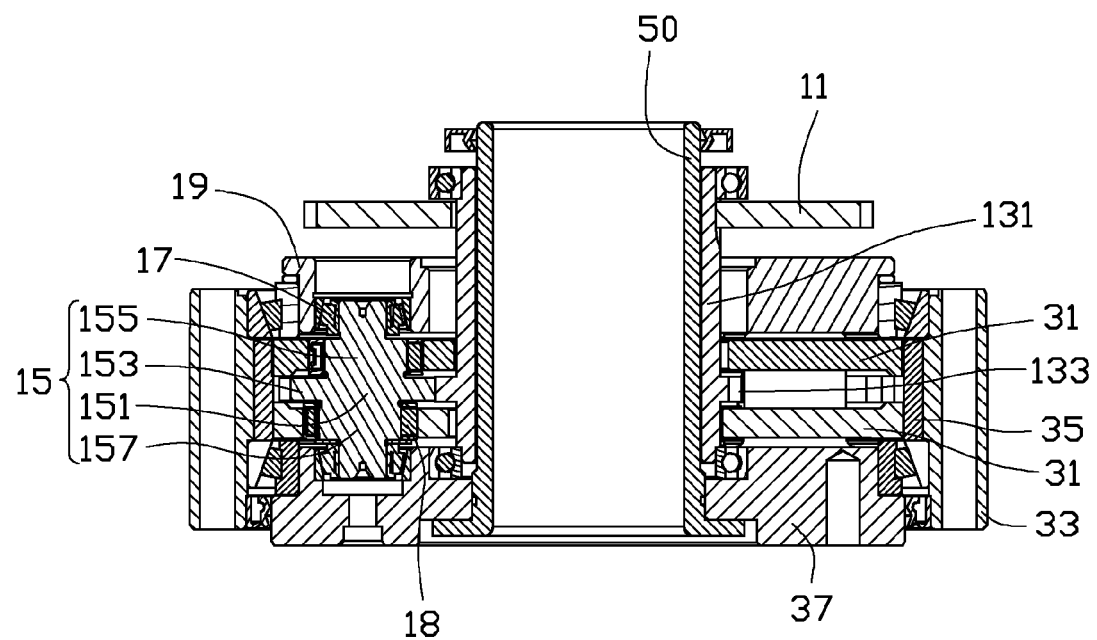
FIG. 4 shows a cross-section view of the cycloid pinwheel reducer of FIG. 1 is along a line VI-VI.

FIGS. 2 through 4 show that the first transmission assembly 10 includes a central gear 11, a first transmission gear 13, a second transmission gear 15, a plurality of first bearings 17, a plurality of second gears 18, and a mounting flange 19.

The central gear 11 is a substantially hollow round plate. A teeth portion 112 is formed in an outer circular wall of the central gear 11 to mesh with the outer driving device. The first transmission gear 13 is non-rotatably connected to the central gear 11. The first transmission gear 13 includes a shaft portion 131 and a first teeth portion 133 protruding from an end of the shaft portion 131. The shaft portion 131 passes through and fixedly-connects with the central gear 11 for rotating along with the central gear 11. The first teeth portion 133 is positioned away from the central gear 11. In other embodiments, a structure of the first transmission gear 13 can be the same as the central gear 11, and the first transmission gear 13 may not include the shaft portion 131. The first teeth portion 133 is formed in an outer circular wall of the first transmission gear 13, and a shaft portion is positioned in the central gear 11 and passes through the first transmission gear 13.

The second transmission gear 15 includes a base body 151, a second teeth portion 153, a first eccentric portion 155, and a second eccentric portion 157. The second teeth portion 153, the first eccentric portion 155, and the second eccentric portion 157 are positioned on the base body 151. The second teeth portion 153 protrudes from a substantially middle portion of the base body 151 along a radial direction toward outside of the base body 151. The second teeth portion 153 of the second transmission gear 15 is meshed with the first teeth portion 133 of the first transmission gear 13. An axis of the second teeth portion 153 is coaxial with the base body 151. The first eccentric portion 155 and the second eccentric portion 157 protrude oppositely from the base body 151 and are positioned at two sides of the second teeth portion 153. The first eccentric portion 155 and the second eccentric portion 157 are substantially in cylindrical shape. Axis of the first eccentric portion 155 and the second eccentric portion 157 deviate from the axis of the base body 151 and are not overlapping each other. In the illustrated embodiment, the axis of the first eccentric portion 155 is symmetrical with the axis of the second eccentric portion 157 relative to the axis of the base body 151. The number of the second transmission gears 15 is three, and the two second transmission gears 15 respectively are meshed with the first teeth portion 133 of the first transmission gear 13. In addition, the three second transmission gears 15 are planet gears.

The number or count of the first bearings 17 is six. Each two first bearings 17 are assembled to one corresponding second transmission gear 15. One of the each two first bearings 17 is sleeved on a first end portion of the base body 151 positioned adjacent to the first eccentric portion 155, another one of the each two first bearings 17 is sleeved on a second end portion of the base body 151 positioned adjacent to the second eccentric portion 157. The number or count of the first bearings 17 is six. Each two second gears 18 are assembled to one corresponding second transmission gear 15. One of the each two second gears 18 is sleeved on the first eccentric portion 155, and another one of the each two second gears 18 is sleeved on the second eccentric portion 157. The mounting flange 19 is a substantially circular plate and sleeved on a shaft portion 131. Three first penetrating holes 191 are separately defined through the mounting flange 19 corresponding to the second transmission gears 15. A latching hole 193 is defined in the flange 19 between each two abutting first penetrating holes 191. The mounting flange 19 is sleeved on one first bearing 17 positioned adjacent to the first eccentric portion 155 via the first penetrating holes 191.

The second transmission assembly 30 includes two cycloid pinwheels 31, a housing 33, a plurality of rollers 35, and an output flange 37. The cycloid pinwheel 31 is a substantially circular plate. A meshing portion 311 is formed in an outer circular wall of the cycloid pinwheel 31. Three first through holes 313 are separately defined in each cycloid pinwheel 31 corresponding to the three second transmission gears 15. Six second through holes 315 are defined in each cycloid pinwheel 31, and each two second through holes 315 are positioned between each two abutting first through holes 313. One cycloid pinwheel 31 is sleeved on the first eccentric portion 155 via the first through hole 313 thereof, another cycloid pinwheel 31 is sleeved on the second eccentric portion 157 via the first through hole 313 thereof. The housing 33 is a substantial cylinder. An inner teeth ring 331 is formed in an inner wall of the housing 33. The housing 33 is sleeved on the two cycloid pinwheels 31. The rollers 35 roll in position between the meshing portion 311 and the inner teeth ring 331. The output flange 37 is non-rotatably connected with the cycloid pinwheels 31. The output flange 37 includes a main body 371 and a plurality of transmission portions 373 protruding from the main body 371. The main body 371 is a substantially round plate. Three second penetrating holes 372 are separately defined in the main body 371 corresponding the three second transmission gears 15. The main body 371 is sleeved on the first bearings 17 positioned away from the first eccentric portions 155 via the second penetrating holes 372. The number or count of the transmission portions 373 is six. Each two transmission portions 373 are positioned between two abutting second penetrating holes 372. A protrusion 375 protrudes from an end of the transmission portion 373 positioned away from the main body 371. The six transmission portions 373 respectively pass through the six second through holes 315. The protrusion 375 of the output flange 37 is latched in the latching hole 193 of the mounting flange 19.

The cable tube 50 is received through the shaft portion 131 and the main body 371, and is fixedly connected to the main body 371. An axis of the cable tube 50 is coaxial with the axis of the shaft portion 131.

In assembly, the central gear 11 is sleeved on the shaft portion 131. The second teeth portions 153 of the second transmission gear 15 are meshed with the first teeth portion 133 of the first transmission gear 13. The second gears 18 are sleeved on the first eccentric portions 155 and the second eccentric portions 157, respectively. The first bearings 17 are sleeved on opposite ends of the base portion 151. The two cycloid pinwheels 31 are sleeved on the second gears 18. The mounting flange 19 is sleeved on the first bearing 17 positioned adjacent to the second eccentric portion 157. The housing 33 is sleeved on the two cycloid pinwheels 31, and the rollers 35 are rolled and positioned between the meshing portion 311 and the inner teeth ring 331. The output flange 37 is sleeved on the first bearing 17 positioned away from the first eccentric portion 155. The transmission portions 373 pass through the second through holes 315. The protrusion 375 is latched in the latching hole 193.

In use, the central gear 11 is meshed with the outer driving device. The outer driving device rotates the central gear 11 to cause the second transmission gears 15 to rotate about the axis of the base body 151. The two cycloid pinwheels 31 spin when the second transmission gears 15 rotate, because of the axes of the first eccentric portion 155 and the second eccentric portion 157 deviating from the axis of the base body 151. Therefore, the second transmission gears 15 rotate around the first transmission gear 13 and bring the output flange 37 and the mounting flange 19 to rotate around the axis of the base body 371.

As described above, the central gear 11 is meshed with the first transmission gear 13 and the second transmission gear 15 to form a first level speed reduction structure. The first eccentric portion 155 and the second eccentric portion 157 are positioned in the second transmission gear 15, the two cycloid pinwheels 31 are assembled with the first eccentric portion 155 and the second eccentric portion 157. The two cycloid pinwheels 31, the rollers 35, and the housing 33 form one cycloid roller wheel to form a second level speed reduction structure. The two cycloid pinwheels 31 are driven to swing by the rotation of the second transmission gears 15. The second transmission gears 15 rotate around the first transmission gear 13 and bring the output flange 37 and the mounting flange 19 to rotate around the axis of the main body 371.

In other embodiments, the central gear 11 can be omitted, and the outer driving device can be directly connected to the shaft portion 131. The first eccentric portion 155 and the second eccentric portion 157 can be positioned at a same side of the second teeth portion 153.

While the present disclosure has been described with reference to particular embodiments, the description is illustrative of the disclosure and is not to be construed as limiting the disclosure. Therefore, various modifications can be made to the embodiments by those of ordinary skill in the art without departing from the true spirit and scope of the disclosure, as defined by the appended claims.

What is claimed is:

1. A cycloid pinwheel reducer, comprising:
a housing forming an inner teeth ring in an inner wall of the housing;
two cycloid pinwheels received in the housing, each of the two cycloid pinwheels forming a meshing portion;
a plurality of rollers rolling in positioning between the inner teeth ring and the meshing portions;
an output flange non-rotatably connected with the two cycloid pinwheels for rotating together with the two cycloid pinwheels; and
a first transmission assembly comprising a first transmission gear and a second transmission gear, the second transmission gear meshed with the first transmission gear; and
wherein the first transmission gear comprises a shaft portion and a first teeth portion formed on one end of the shaft portion, the second transmission gear comprises a base body, a second teeth portion, a first eccentric portion, and a second eccentric portion, the second teeth portion, the first eccentric portion, and the second eccentric portion are positioned on the base body, the second teeth portion protrudes from the base body along a radial direction toward outside of the base body, the first eccentric portion and the second eccentric portion protrude oppositely from the base body and are positioned at two sides of the second teeth portion, the second eccentric portion is located adjacent to the output flange the second teeth portion is meshed with the first teeth portion, one of the two cycloid pinwheels is sleeved on the first eccentric portion, another one of the two cycloid pinwheels is sleeved on the second eccentric portion, and the cycloid pinwheel reducer further comprises a cable tube passing through the shaft portion and the first teeth portion of the first transmission gear, and passing through the output flange.

2. The cycloid pinwheel reducer of claim 1, wherein the first transmission assembly further comprises two first bearings and a mounting flange, a plurality of first penetrating holes are separately defined through the flange, and the output flange defines a plurality of second penetrating holes, the two first bearings are respectively sleeved on the opposite ends of the base body, the mounting flange is sleeved on one of the two first bearings positioned adjacent to the first eccentric portion via the first penetrating hole, the output flange is sleeved on another one of the two first bearings via the second penetrating hole.

3. The cycloid pinwheel reducer of claim 2, wherein the output flange comprises a main body and a plurality of transmission portions protruding from the main body, each of the two cycloid pinwheels defines a plurality of first through holes and a plurality of second through holes, one of the two cycloid pinwheels is sleeved on the first eccentric portion via the plurality of first through holes, another one of the two cycloid pinwheels is sleeved on the second eccentric portion via the plurality of first through holes, and the plurality of transmission portions pass through the plurality of second through holes.

4. The cycloid pinwheel reducer of claim 3, wherein a protrusion is formed on an end portion of the main body away from the main body, the mounting flange defines a latching hole, the protrusion is latched in the latching hole.

5. The cycloid pinwheel reducer of claim 3, wherein an axis of the first eccentric portion is symmetrical with an axis of the second eccentric portion relative to the axis of the base body.

6. The cycloid pinwheel reducer of claim 1, wherein the second transmission gear is a planet gear.

7. The cycloid pinwheel reducer of claim 1, wherein the first transmission assembly further comprises a central gear non-rotatably connected to the first transmission gear, the cable tuber passes through the central gear.

* * * * *